(No Model.)

F. & A. LEDUC.
WINDOW SCREEN.

No. 407,669. Patented July 23, 1889.

Witnesses.
John Schuman.
M. E. Hunt.

Inventors
Frank Leduc
Ambrose Leduc
by Charles J. Hunt
their Att'y

UNITED STATES PATENT OFFICE.

FRANK LEDUC AND AMBROSE LEDUC, OF DETROIT, MICHIGAN.

WINDOW-SCREEN.

SPECIFICATION forming part of Letters Patent No. 407,669, dated July 23, 1889.

Application filed October 30, 1888. Serial No. 289,558. (No model.)

*To all whom it may concern:*

Be it known that we, FRANK LEDUC and AMBROSE LEDUC, of Detroit, in the county of Wayne and State of Michigan, have invented new and useful Improvements in Window-Screens; and we do hereby declare that the following is a full, clear, and exact description thereof, reference being had to the accompanying drawings, which form a part of this specification.

Our invention relates to that class of window-screens which are provided with movable wings to permit of their insertion in window-frames; and it consists in the peculiar construction of the guide-rods and wings, by means of which a strong and durable connection is made between the two and all lateral pressure on the wings resisted or prevented, and in the peculiar combinations and arrangements hereinafter more particularly set forth.

Figure 1:
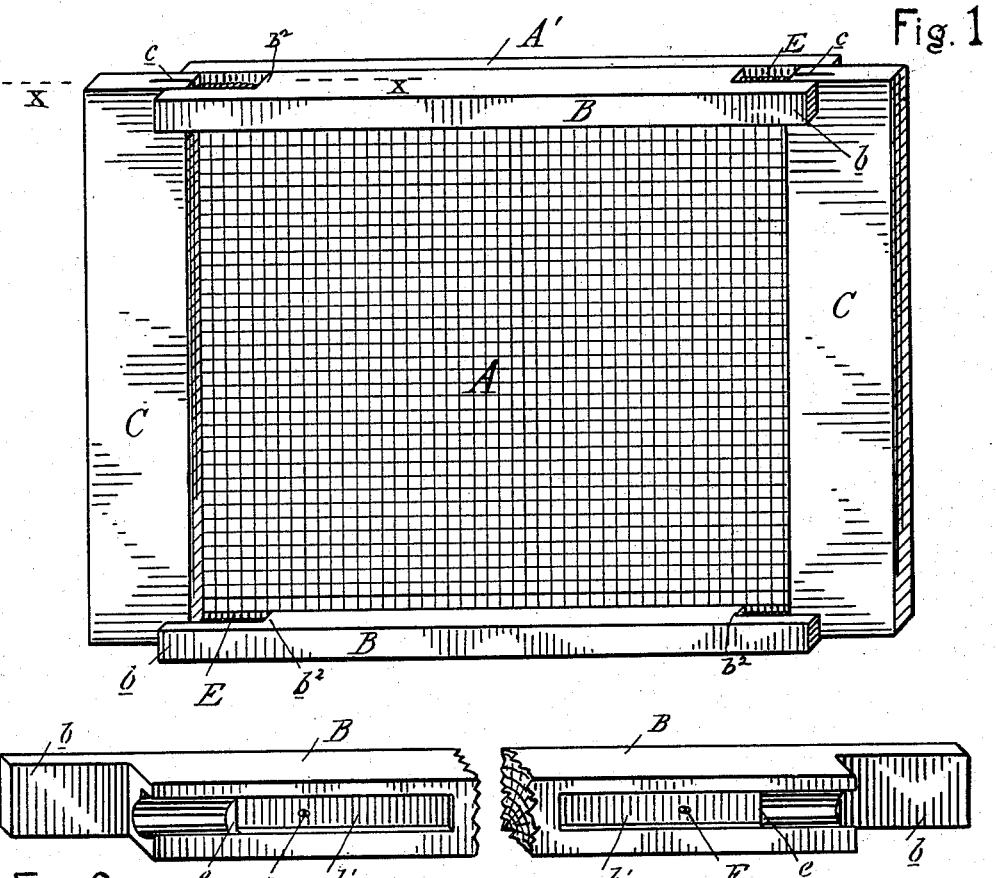
Figure 2:
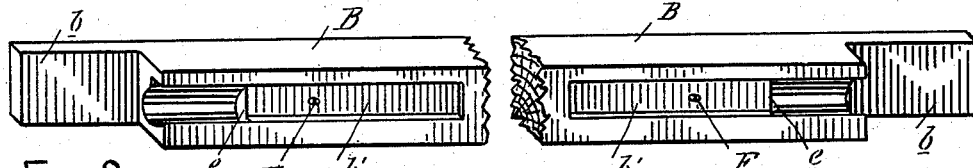
Figure 3:
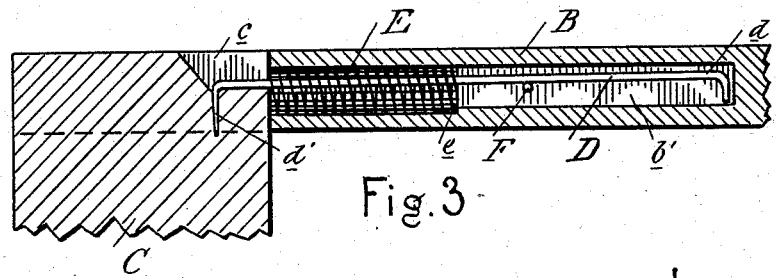

Figure 1 is a perspective view of our window-screen. Fig. 2 is a perspective view of the inner side of the supplemental rail detached. Fig. 3 is a vertical sectional view through the line $x\,x$ in Fig. 1 of one corner of the screen and wing.

A represents the main frame of the window-screen.

B B are supplemental rails, which are nailed or otherwise secured to the inner side of the rail A' of the frame of the screen.

C C are the wings, which reciprocate in the recesses formed between the main frame and the arm $b$ of the supplemental rail, their inward movement being limited by the shoulders $b^2$ on the supplemental rail. These wings are provided with guide-rods D. This rod is bent at its ends at right angles to form the two arms $d\,d'$, the arm $d'$ being a little longer than the arm $d$. The end of this rod, with the arm $d'$, is inserted in the slot $c$, cut in the end of the wing and opening on its inner edge, and the arm $d'$ is driven into the wing, the walls of the slot retaining the rod or wire in the proper position and direction. The coiled spring E is sleeved on this rod, and the rod and spring are inserted in the groove $b'$, cut in the inner side of the supplemental rail. This groove, for about one-third of its length at its outer end, is semicircular in cross-section in its deepest part for the reception of the coiled spring, and rectangular in its inner and shallower part. This rectangular and shallower part is of sufficient length to permit the free inward movement of the guide-rod D. The outward movement of the guide-rod D and the wing C is limited by the stop F in the groove $b'$, against which the arm $d$ of the rod D impinges as the rod moves outward, and its further movement with that of the wing is arrested. The semicircular part of the groove $b'$ at its inner end terminates in the shoulder $e$. The inner end of the coiled spring E rests against the shoulder $e$, while its outer end rests against the inner edge of the wing C. The retraction of the wing forces the spring together, and when the wing is left free the spring expands and extends the wing until the arm $d$ comes in contact with the stop F in the groove $b'$. The advantage of this position of the spring in connection with the wing is that the action of the wing is positive and free; that the screen may be placed in an aperture which is not an exact parallelogram, as one end of the wing may extend farther than the other; that it is not liable to get out of order, as the guide-rod and the walls on all sides of the groove keep the spring in place; and if it should get out of order the defect can easily be found and repaired.

What we claim as our invention is—

In a window-screen, the combination of the main frame A with the supplemental rails B, provided with the arm $b$, shoulder $b^2$, and groove $b'$, the wing C, having the slot $c$ to hold the rod D, the guide-rod D, reciprocating in the groove $b'$ and provided with the arm $d'$, to be inserted in the wing C, and arm $d$, to engage with the stop F in the groove $b'$, the coiled spring sleeved on the guide-rod D, and the stop F, as and for the purposes set forth.

FRANK LEDUC.
AMBROSE LEDUC.

Witnesses:
 E. B. WENDEL,
 WAYNE CHOATE.